United States Patent [19]

Pospischil

[11] Patent Number: 4,663,501

[45] Date of Patent: May 5, 1987

[54] SELF-SYNCHRONIZING DESCRAMBLER

[75] Inventor: Reinhard Pospischil, Graefelfing, Fed. Rep. of Germany

[73] Assignee: Siemens Aktiengesellschaft, Berlin and Munich, Fed. Rep. of Germany

[21] Appl. No.: 754,260

[22] Filed: Jul. 12, 1985

[30] Foreign Application Priority Data

Aug. 8, 1984 [DE] Fed. Rep. of Germany ....... 3429278

[51] Int. Cl.[4] .............................................. H04L 9/00
[52] U.S. Cl. .............................. 178/22.17; 178/22.17
[58] Field of Search ................ 178/22.14, 22.17, 22.19

[56] References Cited

FOREIGN PATENT DOCUMENTS 2410921 6/1979 France .
1591805 6/1981 United Kingdom .

OTHER PUBLICATIONS

"Parallel asbeitende Scrambler, Descrambler und Zufallsfolgen-Generation", Elektronik Arbeitsplatt No. 163, pp. 67-70, 12/30/83.
Realisierung von Scramblern fur PCM-Signale Hoher Taktfrequenz K. H. Mohramann-Springer-Verlag 1977, vol. 6, No. 1, pp. 1-5.
NTZ 1974 Heft-12 Bit Sequence Independence Through Scramblers in Digital Communications Systems by Horst Muller, Munich pp. 475-479.
A Self-Synchronizing Parallel Scrambler for High Digit Rate Transmission Sytems Using AMI as a Line Code, O. Brugia G. Campanini, S. Improta, R. Pietroiusti, W. Wolfowicz 1981 IEEE pp. #8.6.1-E8.6.5.

Primary Examiner—Salvatore Cangialosi
Assistant Examiner—Aaron J. Lewis
Attorney, Agent, or Firm—Hill, Van Santen, Steadman & Simpson

[57] ABSTRACT

A self-synchronizing descrambler for high bit rates having a number of parallel operating descrambler stages each of which represents the series connection of first and second modulo-2 adders and at least one shift register stage for the suppression of short periods between the first and second modulo-2 adders, a third modulo-2 adder is interposed which serves to invert at least one bit of the through going signal on the occurrence of a short. The invention can be used as an alternative to existing descramblers with the processing speed being reduced to a fraction of the previous speed, thus, permitting the use of cheaper semiconductor technology (CMOS).

3 Claims, 4 Drawing Figures

SELF-SYNCHRONIZING DESCRAMBLER

BACKGROUND OF THE INVENTION

1. Field of the Invention

The invention relates in general to a self-synchronizing descrambler for descrambling a signal having a period of $2^{n}-1$ bits where the output of at least one shift register stage is connected to the input of a modulo-2 adder.

2. Description of the Prior Art

In digital signal transmission pulse patterns can occur which have a disturbing DC component or whose energy component is particularly high at specific discrete frequencies. So as to avoid these pulse patterns, the digital signal which is to be transmitted is scrambled at the transmitting end by modulo-2 addition with a pseudo-random sequence. At the receiving end, descrambling is effected with a further modulo-2 addition with the pseudo-random sequence which has previously been used at the transmitting end. The next synchronization of the pseudo-random generators used at the transmitting and receiving ends can be avoided by the use of free running, multiplicative or self-synchronizing scramblers and descramblers.

The continued development of the digital telecommunication network has necessitated between central points of the network transmission devices for signals of very high transmission speeds. This results in the need to construct scramblers and descramblers for digital signals of a very high clock frequency.

The Siemens Research and Development reports Volume 6, (1977) No. 1, pages 1 through 5 discloses the possibility of constructing descramblers for digital signals of very high clock frequencies. The digital signals are scrambled in a plurality of parallel channels with a correspondingly lower bit repetition frequency and the signals which are formed are combined by multiplexers. The receiving apparatus is similarly constructed where following a demultiplexer parallel descrambling in a plurality of channels occurs. In addition to the high outlay, this results in the necessity to synchronize multiplexer and demultiplexer to each other.

Governmental authorities have standardized scrambling for the individual hiearchy stages of the digital long range network. Thus, for example, in the CCITT recommendations under V27b of the International Postal Authorities there has been prescribed a scrambler having a scrambling period of 127 bits and a corresponding descrambler.

SUMMARY OF THE INVENTION

It is an object of the present invention to provide a self-synchronizing scrambler which is suitable to transmit digital signals of a high bit repetition frequency and which at a comparatively cheaper outlay dispenses with a demultiplexer and which has a period that can be selected to be independent of the operating speed and where it is also possible to suppress undesired short periods within a viable outlay.

According to the invention, the object is realized in a self-synchronizing descrambler where the output of at least one shift register stage is connected to the input of a modulo-2 adder and p-parallel inputs are provided in each case for one of the p-parallel bits of the scrambled digital signal and the inputs are classified according to the sequence of the incoming bits with a particular bit at the first input and the following bits at the next inputs and each connected to a descrambler stage which contains at least one shift register stage and at least one modulo-2 adder and the number of the parallel inputs is at least one smaller than the number of the clock pulse control shift register stages contained in the descrambler stages.

A particular advantageous feature of the invention consists in the construction from purely digital components which considerably simplifies the integration and which is readily assessable even in the case of longer descramblers.

Other objects, features, and advantages of the invention will be readily apparent from the following description of certain preferred embodiments thereof taken in conjunction with the accompanying drawings although variations and modifications may be effected without departing from the spirit and scope of the novel concepts of the disclosure and, in which:

DESCRIPTION OF THE PREFERRED EMBODIMENTS

Figure 1:
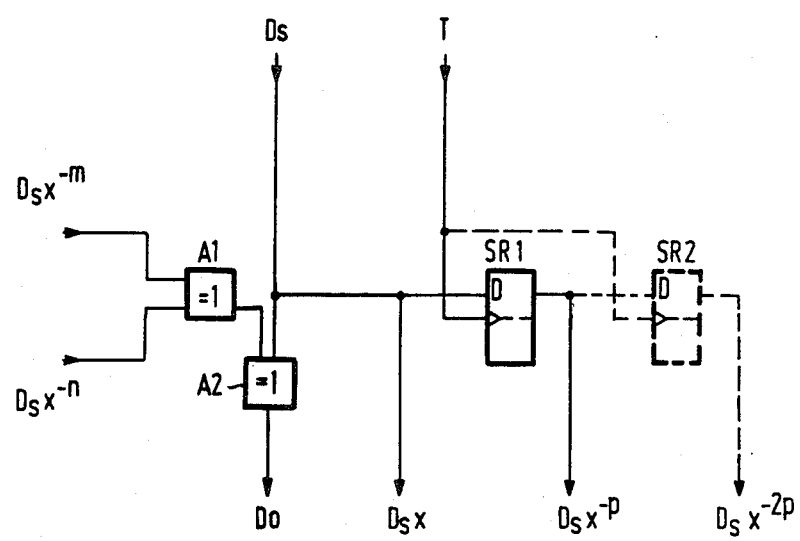
FIG. 1 illustrates a circuit of an individual descrambler stage.

FIG. 1 illustrates a scrambler stage which forms a part of an n-stage descrambler. The descrambler stage contains first and second modulo-2 adders A1 and A2 as well as first and possibly a second shift register stages SR1 and SR2. The descrambler stage serves to descramble the p-th bit of a digital signal so that the corresponding scrambler bit Ds $x^{-2p}$ is emitted from the output of the first shift register stage SR1 and the scrambled bit Ds$x^{-2p}$ is emitted one clock period later from the output of the second shift register stage SR2. The output signal Do of the descrambler stage is obtained from the output of the second modulo-2 adder A2. Thus, in relation to the signal at the first input Ds, the first shift register stage SR1 corresponds to the p-th shift register stage over the overall descrambler. An individual descrambler stage contains an input for the output signal Ds$_{-n}$ of the n-th descrambler stage $E^1$ and the output signal Dsx$^{-m}$ of the m-th descrambler stage. Both of the inputs are simultaneously applied to the inputs of the first modulo-2 adder A1 which has its output connected to the first input of the second modulo-2 adder A2. The other input to the second modulo-2 adder A2 is connected to the input for the input signal Ds which is to be descrambled in the stage. The output terminal of the second modulo-2 adder A2 produces the output signal DO for the descrambled output of this scrambler stage. The input for the signal Ds which is to be descrambled is also connected to the input of the first shift register stage SR1. The first and second shift register stages SR1 and SR2 consist of a clock pulse control D-flip-flop and the output of the flip-flop SR1 is connected to the input of the D-flip-flop of the second shift register stage SR2.

The frequency of the clock signal T for the shift register stages corresponds to the parallel-bit clock rate and, thus, to the bit clock rate of the digital signals divided by the number p of parallel inputs of the scrambler. The number of the shift register stages of the scrambler is designated by n and the stage which has its output signal fed back to the input together with the output of the n-th stage is designated as the m-th stage where m is at least one integer smaller than n.

In prior art self-synchronizing serial descramblers, it is known that the output of the m-th and the output of the n-th stages are connected by way of at least one modulo-2 adder to the input of the first shift register stage. In the present example, the descramblers are arranged in parallel with one or two shift register stages where each of the p descrambler stages has one input at its disposal and the inputs are connected, for example, to the parallel outputs of a series-parallel converter, a source of a digital signal having p-parallel bits. So as to construct the descrambler having n descrambler stages, n-p descrambler stages each having two shift register stages and two p-n descrambler stages each having one shift register stage are required. In the direction of the shift, the n-p descrambler stages each having two shift register stages are followed by two p-n descrambler stages each having only one shift register stage. Where the direction of shift is from left to right, the first descrambler stage on the left of the descrambler stage being considered then has the output signals $Ds\ x^{+1}$, $Ds\ x^{1-p}$ and $Ds\ x^{1-2p}$ where the descrambler stage has two shift register stages and the first descrambler stage following on the right of the initial descrambler stage under consideration has the output signals of $Ds\ x^{-1}$, $D^s\ x^{-1-p}$ and $Ds\ x^{-1-2p}$. In a similar fashion the second descrambler stage on the left of stage under consideration has the output signals $Ds\ x^2$, $Ds\ x^{2-p}$ and $Ds\ x^{2-2p}$ and the second descrambler stage on the right of the stage under consideration has the output signals $Ds\ x^{-2}$, $Ds\ x^{-2-p}$ and $Ds\ x^{-2-2p}$.

Figure 2:
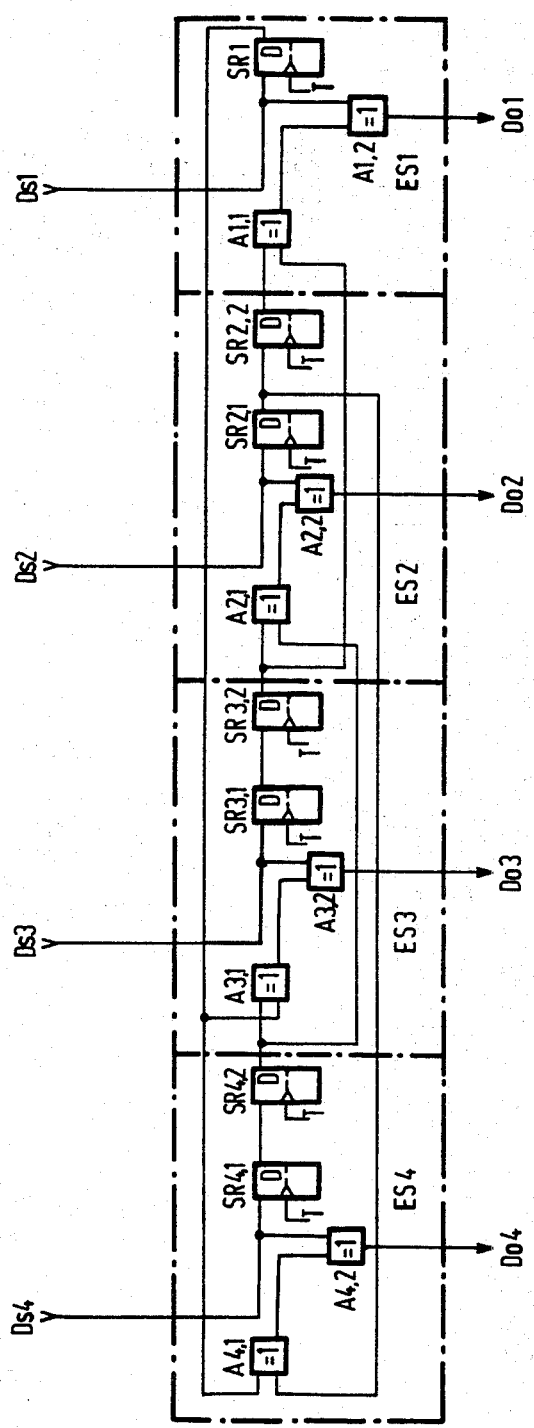
FIG. 2 illustrates a circuit of a descrambler having four parallel descrambler stages and a period of 127 bits.

FIG. 2 illustrates the interconnection of four descrambler stages such as shown in FIG. 1 so as to form one descrambler which comprises seven shift register stages with feedbacks following the sixth and seventh shift register stages and which has four parallel inputs available. Thus, according to the example of FIG. 1 p=4, n=7 and m=6, where the four inputs for the signals Di and the four outputs for the signals Ds are connected in parallel. Thus, for a serial transmission, the descrambler is preceded by a four stage series-parallel converter and is followed by a four stage parallel-series converter. Due to the storage properties of the converters, the series-parallel conversions and the parallel-series conversions need not occur in bit synchronous fashion and neither is word synchronization necessary between the transmitting scrambler and the receiving descrambler.

The scrambler illustrated in FIG. 2 contains four descrambler stages ES1, ES2, ES3, ES4 each of which have inputs Ds1, Ds2, Ds3 and Ds4. With a total of n=7 shift register stages, a period of $2^7-1=127$ bits results. According to the above-described rule considering in the direction of shift n−p=3 descrambler stages having two shift registers are followed by 2p−n=1 descrambler stage having only one shift register stage and consequently the first descrambler stage ES1 has only one shift register SR1. The other descrambler stages ES2, ES3 and ES4 each contain two shift register stages which are indicated respectively as SR2.1, SR2.2, SR3.1, SR3.2, SR4.1 and SR4.2. These are according to FIG. 1 connected to each other and to the corresponding input and also are connected to a common clock pulse source T. The second input of the first modulo-2 adders A1.1, A2.1 and A3.1 of the first to third descrambler stages are each connected to the output of the second shift register stage of the preceding descrambler stage or to the shift register stages SR2.2, SR3.3 and SR4.2. The corresponding input of the first modulo-2 adder A4.1 of the fourth descrambler stage ES4 is connected to the output of the first and only shift register stage SR1 of the first descrambler stage ES1. The first inputs of the first modulo-2 adders A1.1, A2.1 of the first and second descrambler stages ES1 and ES2 are each connected to the output of the second shift register stage SR3.2 and SR4.2 of the second preceding descrambler stage ES3 and ES4. Thus, the first input of the modulo-2 adder A1.1 is connected to the output of the shift register SR3.2 and the first input of the modulo-2 adder A2.1 is connected to the output of the shift register stage SR4.2. A difference exists in the third and fourth descrambler stages ES3 and ES4 in view of the corresponding cyclic exchange of the two first inputs of the first modulo-2 adders A3.1 and A4.1 are connected to one another and to the output of the first and only shift register stage SR1 of the first descrambler stage ES1.

The descrambled signal is obtained from the input signal Ds of the stage in question and from the output signals $Ds\ x^{-6}$ and $Ds\ x^{-7}$ of the sixth and seventh stages on the right side of the descrambler stage under consideration.

In known descramblers, depending upon the input signal pattern it is possible that in the case of specific input signal patterns specific states of the descrambler period can be skipped and that periodic output signal sequences of comparatively short duration can occur. For this reason, descramblers used in practice additionally contain additional shift register stages. For example, the CCITT recommendation V27 and V27b describe a 7-stage scrambler and a corresponding descrambler which so as to avoid short periods are supplemented by five additional shift register stages or a total of 12 shift register stages. In the case of the descrambler corresponding to recommendation V27b, the contents of stages 8, 9 and 12 are then compared with the logic state existing at the input of the shift register chain. If one of the comparator pairs continuously agrees with one another for a period of at least 33 bits, the next input bit is inverted so that longer period output signal sequences of 1, 2, 3, 4, 6, 8, 9 and 12 bit period duration are suppressed. Thus, with the described additional expense and apparatus it is not possible for example to suppress periodic output signal sequences of 5, 7, 10 and 11 bit period durations and the additional suppression of these short periods would result in a further increase and expense and equipment so that the development of descramblers of this type necessitates an application related compromise. This compromise is also necessary for the use of the descramblers at higher transmission speeds since the lengthening of the shift register chains limits the possibility of use at higher transmission speeds.

In the case of the parallel descramblers illustrated in FIG. 2 and also in the case of other descramblers which use the descrambler stage described in FIG. 1 in parallel operation it is necessary to monitor all of the descrambler stages by means of a device for short period suppressions so as to establish the occurrence of short periods, if the descrambler is to be compatible with known series descramblers which contain the shift register stages in a series arrangement.

The suppression of undesired short periods is fundamentally accomplished by means of a counting device connected to the actual descrambler for counting identical bits which occur at the interval of a short period which is to be suppressed. When a preset number of identical bits is overshot, the counting device emits a pulse which is forwarded to the descrambler stage. The counting stage thus forms the main part of the short period suppression device and in order that the descrambler stages may be connected to the counting device, the descrambler stages correspond to FIGS. 3a and 3b are supplemented by one further modulo-2 adder 54, 44, 34, 24 and 14 as illustrated.

This adder is interposed between the first and second modulo-2 adders A1, A2 represented in FIG. 1 in a manner such that the first input of the third modulo-2 adder is connected to the output of the first modulo-2 adder and the second input of the third modulo-2 adder is connected to an assigned output of the short period suppression device. The output of the third modulo-2 adder is connected to that input of the second modulo-2 adder which has previously been connected to the output of the first modulo-2 adder. FIGS. 3a and 3b illustrate a descrambler consistent of five descrambler stages E1 through E5 which have been extended in a manner such that the left portion comprising the descrambler stages E3, E4 and E5 are illustrated in FIG. 3a and the right hand portion comprising decrambler stages E1 and E2 is illustrated in FIG. 3b. The two circuit components are separated from each other by the lines S1 and S2.

Figure 3A:
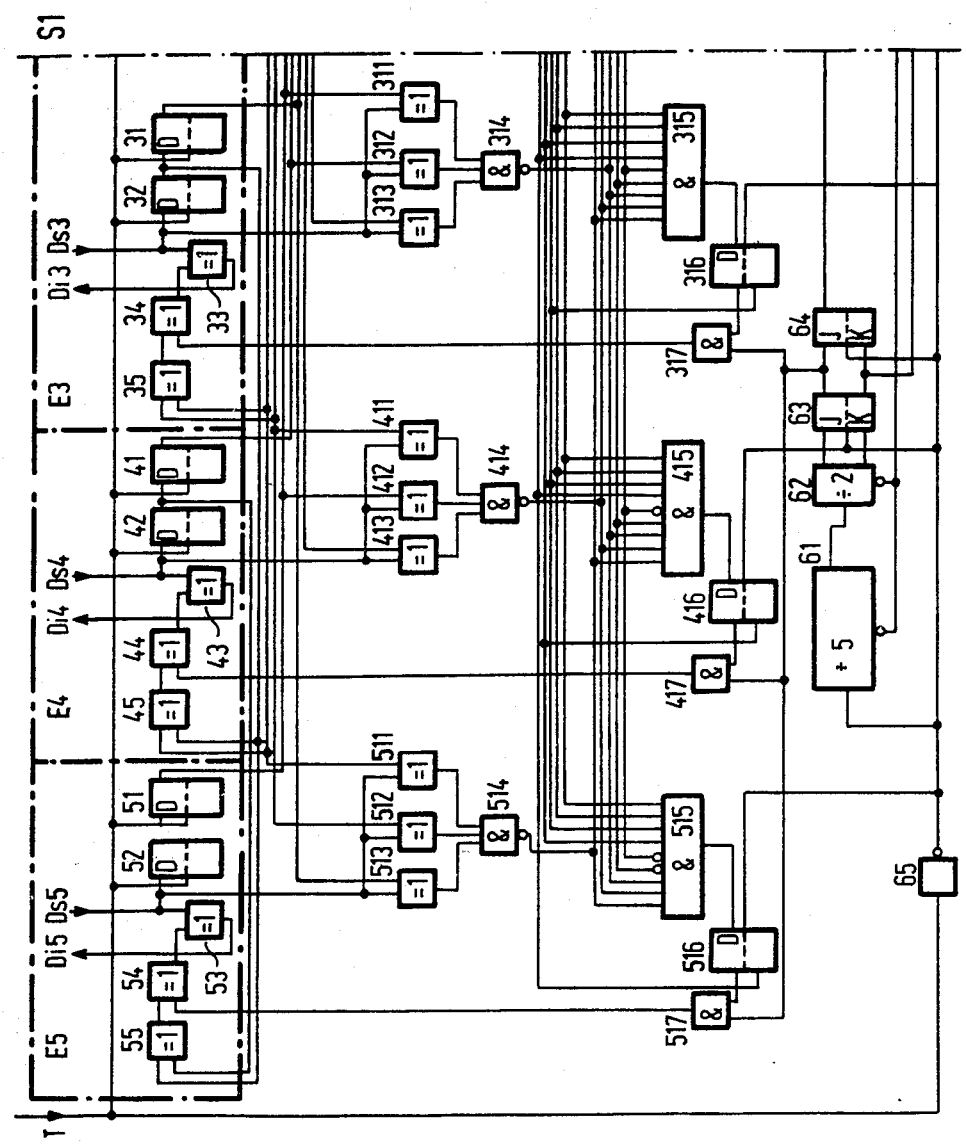
FIGS. 3a and 3b comprise a circuit of a descrambler having five parallel descrambler stages with a scrambler period of 127 bits and with an additional device for suppression of short periods.
Figure 3B:
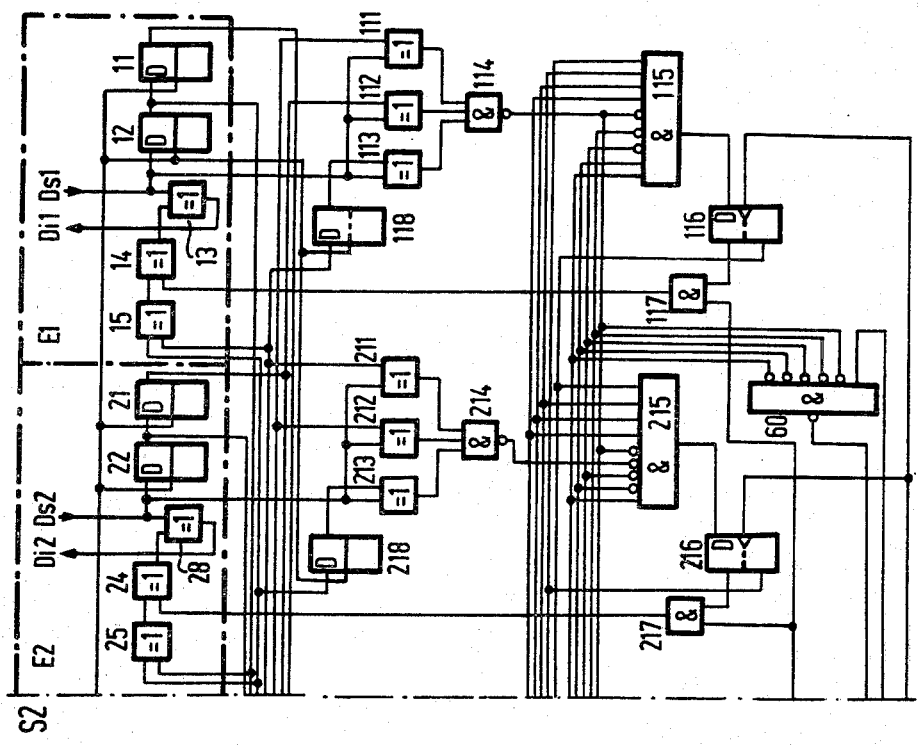

The descrambler illustrated in FIGS. 3a and 3b has five parallel inputs so that $P=5$ and in order to produce a shift period of two of the $7-1=127$ bits, $n=7$ shift register stages have been used where feedback occurs following the $m=6$ and $n=7$ stages.

Therefore, according to the previously described rule there are first provided $n-p=7-5=2$ descrambler stages E5 and E4 each having two shift register stages respectively indicated by 51, 52 and 41 and 42 which are connected to two $2p-n=10-7=10-7=3$ descrambler stages E3, E2 and E1 each of which have one shift register stage designated by 32, 22 and 12.

Consequently, the further shift register stages 31, 21 and 11 which are additionally contained in the descrambler stages E1, E2 and E3 are not essential to the function of the descrambler and form part of the device for short period suppression. This device includes five groups each consisting of three modulo-2 adders which have outputs in each case combined by way of NAND-gate 114, 214, 314, 414 and 514. Each of these three member groups is associated to a descrambler stage where the first inputs of each of the modulo-2 adders 111 and 112, 113; 211, 212, 213; 311, 312, 313; 411, 412, 413; and 511, 512 and 513 are connected to one another and to the D input of the first shift register stage of the assigned descrambler stage.

The second inputs of the two modulo-2 adders of the five groups are connected to the outputs of the individual shift register stages in a manner such that in each three member group the bit occurring at the input of the first shift register stage of a scrambler stage is compared with the eighth, ninth and twelfth stored bits. As the descrambler stages contain a total of only ten shift register stages and, thus, only ten bits can be stored, D flip-flops 118 and 218 have been additionally provided whereas D flip-flops are connected prior to the second inputs of the first modulo-2 adders 113 and 213 of the first and second three member groups and are connected to the same clock pulse source T as the shift register stages of the descrambler stages. The D inputs are connected to the outputs of the second shift register stages of the fourth and fifth descrambler stages. When the bit occurring at the input of the first shift register stage of a k-th descrambler stage is identical to one of the stored bits 8, 9 and 12, the logic one level occurs at the output of the corresponding k-th AND gate 114, 214, 314, 414, and 514 and is emitted by way of an inverting input to the NAND gate 60 so that the gate releases the divider chain 61, 62, 63, 64 through the inverting output.

The divider chain is connected by way of the inverter 65 to the source for the word clock pulse train D of the digital signals and contains a first divider 61 and a second divider 62 having the divider ratio of 2:1 and two subsequently connected JK flip-flops.

The short period suppression device also contains five AND gates 115, 215, 315, 415 and 515 each having a first group of five inputs each of which are separately connected to the outputs of the NAND gates 114, 214, 314, 414, 515 and a second group of four inputs. Each of these four inputs of the second group is connected to the inverting output of one of the D flip-flops 116, 216, 316, 416, 516 whose D inputs are connected to the outputs of one of the NAND gates having nine inputs.

The inverting outputs of these D flip-flops are each connected to an input of one of those gates whose gate output is not connected to the D flip-flop. The non-inverting outputs of the D flip-flops are connected by way of a further AND gate 117, 217, 317, 417, 517 to the two inputs of the third modulo-2 adders of each descrambler stage E1, E2, E3, E4, and E5. The second inputs of the AND gates which are connected to the third through fifth descrambler stages are connected to the output of the JK flip-flops 63 which is contained in the divider chain and which is followed by a further JK flip-flop 64 whose output is connected to the second inputs of the AND gates 117 and 217 which are connected at their output end to the first and second descrambler stages.

The described release of the divider chain 61 to 64 leads to the fact that by way of one of the released AND gates 117, 217, 317, 417, and 517 and the additional third modulo-2 adders in one of the descrambler stages E1 through E5 one bit is inverted and thus an occurring short period is ended. From the very first recognition of the pulse pattern corresponding to a short period the periodicity for each following bit is recognized for such time as the input pattern is retained and thus at the latest following one parallel pulse clock period of five bits, all of the AND gates 114, 214, 314, 414, 514 carry the logic level 1. The AND gates having nine inputs 115, 215, 315, 415, 515 together with the following D flip-flops 116, 216, 316, 416, and 516 now serve to store the information as to that bit which was present at the input of the first shift register of a descrambler stage on the first occasion when a short period was recognized.

The change in the logic value of a bit occurring at the input of a shift register stage of a descrambler stage does not take place directly following the first recognition of the short period criteria. In the present example, the outputs of the gates 114, 214, 314, 414 and 514 have been assigned to the inputs of the AND gates 115, 215, 315, 415, and 515 in a manner such that only the 33rd bit following the first recognition is inverted. If in the present example, the first recognition occurs, for example, in that the output of the AND gate 114 which is assigned to the first descrambler stage assumes the logic value 1 then following 6×5=30 bit timing periods, one bit is inverted by way of the AND gate 315 assigned to the third descrambler stage, the following D flip-flop 316 and the connected AND gate 317 and the third modulo-2 adder 34 of the third descrambler stage E3.

The inputs of the AND gates 60 can also be connected to the non-inverting outputs of the D flip-flops 116, 216, 316, 416, and 516 instead of the outputs of the AND gates 114, 214, 314, 414, and 514. In this case, as a result of the additional divider effect of these D flip-flops, the divider ratio of the frequency divider 61 is to be reduced from 5:1 to 4:1 resulting in the suppression of undesired pulse peaks on the connecting line between the output of the AND gate 60 and the reset input of the divider stages 61 and 62.

Although the invention has been described with respect to preferred embodiments, it is not to be so limited as changes and mofications may be made therein which are within the full intended scope as defined by the appended claims.

I claim as my invention:

1. A self-synchronizing descrambler comprising n clocked shift register stages for descrambling a signal having a period of $2^{n}-1$ bits with p descrambler stages each of which is connected to one of p parallel inputs and having p parallel outputs and contains a series connection of two modulo-2 adders as well as shift register stages, whereby the p parallel inputs for respectively one of said p parallel bits of the signal to be descrambled are ordered according to the sequence of the incoming bits and are respectively connected to the input of a shift register stage and to the input of that modulo-2 adder whose output represents the output of a descrambler stage, characterized in that the individual descrambler stages comprise not more than two clocked shift register stages; in that the plurality p of parallel inputs is at least one less than the number n of the clock pulse controlled shift register stages contained in the descrambler stages, that considered in the direction of shift n−p descrambler stages each having two clock pulse controlled shift register stages are followed by 2 p−n descrambler stages each having only one clock pulse controlled shift register stage, the descrambler stages contain a first and a second modulo-2-adder (A1, A2), the output of the first modulo-2-adder is connected to the first input of the second modulo-2-adder whose other input is connected to one of the p parallel imputs for the signal which is to be descrambled, and the descrambled signal can be obtained from the output of the second modulo-2-adder, the input for the scrambled signal is also connected to the input of a first clock pulse controlled shift register stage (SR1) at whose output can be obtained the scrambled digital signal (Ds $x^{-p}$) delayed by one clock pulse period, and is further connected to the input of a further clock pulse controlled shift register stage (SR2) whose clock pulse input is connected in parallel with the clock pulse input of the first shift register stage and at whose output there can be obtained a scrambled, digital signal (Ds $x^{-2p}$) delayed by two clock pulse periods, the clock pulse frequency of the clock pulse signal (T) which is supplied to the shift register stages corresponds to the clock frequency of the digital signals which are to be descrambled, divided by the number p of the descrambler stages, and that the first input of the first modulo-2-adder (A1) is connected to the output of a descrambler stage in which the n-th preceding bit of the descrambled digital signal occurs, and the other input of the first modulo-2-adder is connected to a descrambler stage in which the m-th, preceding bit of the scrambled digital signal occurs, and m n and is a whole number.

2. A self-synchronizing descrambler as claimed in patent claim 1, characterized in that for the parallel processing of four bits, four descrambler stages (ES1 . . . ES4) are provided, each of which have one input (Ds1 . . . Ds4) for the parallel reception of four bits of the digital signal which is to be descrambled, the first descrambler stage (ES1) has a first modulo-2-adder (A1.1) whose output is connected to the input of a second modulo-2-adder (A1.2), whose other input is connected to the input (Ds1) of the first descrambler stage, and whose output is connected to the input of a first shift register stage (SR1) and to a first output (D.1) for the first bit of the descrambled digital signal, the clock input of the first shift register stage (SR1) is connected to a source for a clock signal (T) which was generated from the clock signal of the digital signal to be descrambled by frequency division in the ratio 4:1, the first input of the first modulo-2-adder (A1.1) of the first descrambler stage (ES1) is connected to the second input of the first modulo-2-adder (A2.1) of the second descrambler stage (ES2), the output of this modulo-2-adder (A2.1) is connected to the first input of the second modulo-2-adder (A2.2) and its second input [sic] is connected to the input (Ds2) of the second descrambler stage (ES2), the output of the second modulo-2-adder (A2.2) is connected to the output (Do2) of the second descrambler stage (ES2), the input of the second descrambler stage (ES2) is also cnnected to the input of the first shift register stage (SR2.1) of the second descrambler stage (ES2), the output of this shift register stage (SR2.1) is connected to the input of a second shift register stage (SR2.2) of the same descrambler stage (ES2) and also to the first input of a first modulo-2-adder (A4.1) of the fourth descrambler stage (Es4), the output of the second shift register stage (SR2.2) of the second descrambler stage (ES2) is connected to the second input of the first modulo-2-adder (A1.1) of the first descrambler stage (Es1), the first input of the first modulo-2-adder (A2.1) of the second descrambler stage (ES2) is connected to the second input of a first modulo-2-adder (A3.1) of the third descrambler stage (ES3) whose output is connected to the first input of a second modulo-2-adder (A3.2) of the same descrambler stage, the other input of the second modulo-2-adder (A3.2) is connected to the input (Ds3) of the third descrambler stage (ES3), and also to an input of a first shift register stage (SR3.1) of the third descrambler stage (ES3) to which the input (Ds3) of the third descrambler stage is connected, the output of the first shift register stage of the third descrambler stage (ES3) is connected to the input of a second shift register stage (SR3.2) within the same descrambler stage, the output of the second shift register stage (SR3.2) is connected to the second input of the first modulo-2-adder (A2.1) of the second descrambler stage (VS2), the first input of the first modulo-2-adder (A3.1) of the third descrambler stage (ES3) is connected to a second input of a first modulo-2-adder (A4.1) of the fourth descrambler stage (ES4) which has its output connected to the first input of a second modulo-2-adder (A4.2) of the fourth descrambler stage (ES4) and whose second input is connected to the input (Ds4) of the fourth scrambler stage, the output of said second modulo-2-adder (A4.2) is connected to the output (Do4) of the fourth descrambler stage (ES4), the input (Ds4) is connected to the input of a first shift register stage (SR4.1) of the fourth descrambler stage (ES4), the output of this second shift register stage (SR4.1) is connected to the input of a second shift register stage (SR4.2) of the fourth descrambler stage (ES4), and the output of said second shift register stage is connected to the second input of the first modulo-2-adder (A3.1) of the third descrambler stage (ES3), and the clock pulse inputs to all the shift register stages are connected to each other and to the source for the first clock pulse signal (T).

3. A self-synchronizing descrambler as claimed in patent claim 1, characterized in that the suppression of short periods is effected in that in at least one descrambler stage between the first and second modulo-2-adders there is interposed a third modulo-2-adder (14, 24, 34, 44, 54) whose first input is connected to the output of the first modulo-2-adder, whose output is connected to the input of the second modulo-2-adder, and whose second input is connected to the output of a counting device for counting identical bits which occur at the interval of a short period which is to be suppressed, where the counting device emits a pulse when a preset number of identical bits is exceeded.

* * * * *